United States Patent
Dunk

(10) Patent No.: US 7,710,984 B2
(45) Date of Patent: May 4, 2010

(54) DATA TRANSFER FROM A HOST SERVER VIA A TUNNEL SERVER TO A WIRELESS DEVICE, AND ASSOCIATING A TEMPORARY IPV6 ADDRESS WITH A TEMPORARY IPV4 ADDRESS FOR COMMUNICATING IN AN IPV4 WIRELESS NETWORK WITH THE DEVICE

(75) Inventor: Craig A. Dunk, Guelph (CA)

(73) Assignee: Research In Motion Limited, Waterloo, Ontario (CA)

( * ) Notice: Subject to any disclaimer, the term of this patent is extended or adjusted under 35 U.S.C. 154(b) by 1309 days.

(21) Appl. No.: 10/477,333

(22) PCT Filed: Dec. 20, 2002

(86) PCT No.: PCT/CA02/02012

§ 371 (c)(1),
(2), (4) Date: Nov. 6, 2003

(87) PCT Pub. No.: WO2004/049668

PCT Pub. Date: Jun. 10, 2004

(65) Prior Publication Data

US 2004/0264465 A1 Dec. 30, 2004

(51) Int. Cl.
*H04L 12/56* (2006.01)
(52) U.S. Cl. .................. 370/400; 370/231; 370/235; 370/338; 370/393
(58) Field of Classification Search .......... 370/351, 370/395.52, 356, 396, 395.2, 395.31, 401, 370/405, 352, 235, 340, 341, 400, 229, 230, 370/231, 315, 327, 328, 329, 331, 338, 389, 370/392, 393, 466, 467
See application file for complete search history.

(56) References Cited

U.S. PATENT DOCUMENTS 6,101,543 A * 8/2000 Alden et al. ............... 709/229

(Continued)

FOREIGN PATENT DOCUMENTS

WO 0232062 4/2002

(Continued)

OTHER PUBLICATIONS

Title: OSPF Author: Kevin Beamer Date: Feb. 16, 1998.*

(Continued)

*Primary Examiner*—Ricky Ngo
*Assistant Examiner*—Wei-Po Kao
(74) *Attorney, Agent, or Firm*—John J. Oskorep, Esq.

(57) ABSTRACT

A front end of an IPv6 communication network includes a network entry point device and a plurality of tunnel servers which facilitate the communication of user information between a host computer of an IPv4 communication network and an IPv6 wireless communication device. The network entry point device is configured to direct a tunnel request from the host computer to a selected tunnel server, which establishes a tunnel connection with the host computer. The tunnel server facilitates the communication of user information between the host and the wireless device through the tunnel connection. The tunnel server also performs a dynamic routing protocol (DRP). In accordance with the DRP, the tunnel server updates a local routing table to reflect the newly established tunnel connection and broadcasts updated routing table information to the other tunnel servers. In another related technical aspect, a back end of the IPv6 communication network facilitates communication with the IPv6 wireless device when it operates in an IPv4 wireless communication network.

22 Claims, 8 Drawing Sheets

U.S. PATENT DOCUMENTS

| | | | |
|---|---|---|---|
| 6,172,986 B1 * | 1/2001 | Watanuki et al. | 370/466 |
| 6,512,754 B2 * | 1/2003 | Feder et al. | 370/338 |
| 6,594,246 B1 * | 7/2003 | Jorgensen | 370/338 |
| 6,671,729 B1 * | 12/2003 | Gordon et al. | 709/227 |
| 6,763,018 B1 * | 7/2004 | Puthiyandyil et al. | 370/352 |
| 6,862,274 B1 * | 3/2005 | Tsao et al. | 370/338 |
| 7,155,740 B2 * | 12/2006 | Brustoloni | 726/15 |
| 7,310,351 B2 * | 12/2007 | Asano et al. | 370/466 |
| 2001/0040895 A1 * | 11/2001 | Templin | 370/466 |
| 2001/0055285 A1 | 12/2001 | Tomoike | |
| 2002/0012320 A1 | 1/2002 | Ogier et al. | |
| 2002/0026482 A1 * | 2/2002 | Morishige et al. | 709/206 |
| 2002/0026527 A1 | 2/2002 | Das et al. | |
| 2002/0150112 A1 | 10/2002 | Tsuchiya et al. | |
| 2002/0191548 A1 * | 12/2002 | Ylonen et al. | 370/254 |
| 2003/0016676 A1 * | 1/2003 | Allen et al. | 370/395.52 |
| 2003/0026289 A1 * | 2/2003 | Mukherjee et al. | 370/466 |
| 2003/0088698 A1 * | 5/2003 | Singh et al. | 709/239 |
| 2004/0013130 A1 * | 1/2004 | Blanchet et al. | 370/466 |
| 2004/0095912 A1 * | 5/2004 | Gao et al. | 370/338 |
| 2004/0136358 A1 * | 7/2004 | Hind et al. | 370/352 |

FOREIGN PATENT DOCUMENTS

| | | | |
|---|---|---|---|
| WO | WO 0232062 A | 4/2002 | |
| WO | WO 02093811 A | 4/2002 | |
| WO | 0235794 A2 | 5/2002 | |
| WO | 0235794 A3 | 5/2002 | |
| WO | WO 0235794 A | 5/2002 | |
| WO | 02093811 | 11/2002 | |
| WO | 030941365 | 5/2003 | |
| WO | WO 03041365 A | 5/2003 | |

OTHER PUBLICATIONS

Title: Intra-site Automatic Tunnel Addrressing Protocol (ISATAP) Author: Fred Templin Date: Nov. 21, 2001.*
Title: IPv6 on NBMA Author: Armitage et al Date: Jan. 1999.*
Title: care of address Date: Sep. 8, 2002.*
Title: IPv6 on NBMA Author: Armitage et al Date: Jan. 1999.*
Neilsen et al., "Armstrong IPv6 deployment—'A small step for IP but a giant leap for mankind' (Transition strategies IPv4 to IPv6)," Mar. 2001, XP002233200, retrieved from the Internet: <url:http://www.eurescom.de/{pub-deliverables/P1000-series/P1009/TI_1/p1009ti_1.pdf>.
"Search Report for Application # PCT/ CA 02/02012", Dec. 20, 2002.
"Nielsen P.R.", "Transition Strategies IPV4-IPV6", "http://www.eurescom.de/(pub-deliverables/p1000-series/p1009/ti_1.pdf>", "March 2001", pp. 1-38.

* cited by examiner

DATA TRANSFER FROM A HOST SERVER VIA A TUNNEL SERVER TO A WIRELESS DEVICE, AND ASSOCIATING A TEMPORARY IPV6 ADDRESS WITH A TEMPORARY IPV4 ADDRESS FOR COMMUNICATING IN AN IPV4 WIRELESS NETWORK WITH THE DEVICE

BACKGROUND

1. Field of the Technology

The present application relates generally to IPv4-to-IPv6 address transitioning methods and apparatus for systems that "push" information to wireless communication devices.

2. Description of Related Technology

There are presently several proposals for pushing information to a wireless communication device in an Internet Protocol (IP) based wireless network. In these networks, wireless devices are not provided with permanent identifiers, but instead are dynamically assigned an IP address from a pool of available addresses. Each time the wireless device makes a network connection, a different IP address is typically assigned to the wireless device.

Thus, for services attempting to push information to the particular wireless device, it is difficult to address the information since the IP address is not permanent. These proposals do not adequately deal with the problems of how to address the wireless device when pushing information to it, and how to bridge the solution to future third-generation (3G) wireless networks, such as a General Packet Radio Service (GPRS) network. The solutions provided by these proposals involve either creating a proprietary Personal Identification Number (PIN) for each wireless device, or trying to use a phone number (or similar permanent identifier) of the wireless device to contact it over an alternative communication network (e.g. a short messaging service (SMS) over a circuit-switched channel).

What makes the situation more difficult is the desire to implement such systems using IPv6 addressing. Many networks and devices still use IPv4 addresses and do not support IPv6 addressing. Such networks and devices may be outside the control of a service provider. Although ideally all networks and devices involved are simultaneously upgraded to support IPv6 addressing, this is highly unlikely to occur in actual practice. In the meantime, solutions are needed for the transition from IPv4 to IPv6 addressing in systems that push information to wireless communication devices having permanent IPv6 addresses.

SUMMARY

In the present application, two related IPv4-to-IPv6 address transitioning methodologies for systems that push information to wireless communication devices are described. In general, an IPv6 serving network is used to facilitate the communication of user information between a plurality of host computers and a plurality of wireless communication devices. The first technical aspect relates to a "front end" of the serving network; that is, a host computer's entry point and connection to the serving network. The second technical aspect relates to a "back end" of the serving network; that is, the exit point from the serving network to a wireless communication device.

According to the first technical aspect, the IPv6 serving network includes a network entry point device and a plurality of tunnel servers for facilitating the communication of user information between host computers in IPv4 communication networks and the wireless devices. The network entry point device is operative to direct a plurality of tunnel requests from the host computers to the tunnel servers in a distributed manner. Each tunnel server is operative to establish and maintain tunnel connections with host computers and to facilitate the communication of user information between them and their associated wireless devices. Each tunnel server is also operative to perform a dynamic routing protocol (DRP). The DRP is utilized for updating a local routing table to reflect newly established tunnel connections and for broadcasting updated routing table information to other tunnel servers.

When a host computer detects a connection failure with the serving network, it initiates a new connection with it by sending a new tunnel request through the network entry point device, which directs it to a newly selected and available tunnel server. In accordance with the DRP, the new tunnel server then updates its local routing table and broadcasts updated routing table information to the other tunnel servers. In this way, routes between devices are quickly and easily reestablished after a failure occurs. Preferably, the DRP utilizes "link state advertisements" (LSAs) and is based on an Open Shortest Path First (OSPF) standard. As apparent, the front end of the network is suitably configured to provide for scalability and fault tolerance as well as to serve as an effective IPv4-to-IPv6 address transitioning mechanism.

According to the second technical aspect, the IPv6 serving network facilitates communications between a host computer and an IPv6 wireless device operating in an IPv4 wireless network. When the wireless device enters the IPv4 wireless network, the IPv4 wireless network identifies a temporary IPv4 address for the wireless device. In addition, a router between the IPv6 serving network and the IPv4 wireless network identifies a temporary IPv6 address for the wireless device. Preferably, the temporary IPv6 address assigned to the wireless device has the temporary IPv4 address embedded within it.

In one particular implementation, a request for the temporary IPv6 address is made by the wireless device after it receives the temporary IPv4 address through the network; this temporary IPv4 address is sent along with the request and subsequently used for determining the temporary IPv6 address. The router may operate in accordance with an Intra-Site Automatic Tunnel Addressing Protocol (ISATAP) standard for determining the temporary IPv6 address and facilitating communications between the IPv6 serving network and the IPv4 wireless network.

Once the temporary IPv6 address is assigned and received, the wireless device sends the temporary IPv6 address to a home agent in a virtual home network. The home agent stores the temporary IPv6 address in association with the permanent IPv6 address of the wireless device as its Care-Of Address (COA). The message sent from the wireless device may be referred to as a "Binding Update" message. Thereafter, when the home agent subsequently receives data packets addressed to the permanent IPv6 address of the wireless device, it readdresses the data packets with the temporary IPv6 address of the wireless device for routing through the IPv6 serving network. When the router receives the data packets addressed to the temporary IPv6 address of the wireless device, it encapsulates these data packets with the temporary IPv4 address for routing to the wireless device through the IPv4 wireless network.

Accordingly, IPv4-to-IPv6 address transitioning mechanisms suitable for systems that push information to wireless communication devices are advantageously provided.

DETAILED DESCRIPTION OF THE PREFERRED EMBODIMENTS

The present application relates to two related methodologies for facilitating the communication of user information from a plurality of host computers to a plurality of wireless communication devices through a serving network. The first technical aspect relates to a front end of the serving network, i.e., a host computer's entry point and connection to the serving network. This first aspect is described below in detail in relation to FIGS. 1-3. The second technical aspect relates to a back end of the serving network, i.e., the exit point from the serving network to a wireless communication device. This second aspect is described below in detail in relation to FIGS. 4-7. Each technical aspect provides an IPv4-to-IPv6 address transitioning mechanism suited particularly for systems that push information to wireless communication devices. Although the first and the second methodologies need not be employed together in the same system, they are preferably utilized in combination in the serving network to exploit their advantages.

Figure 1:
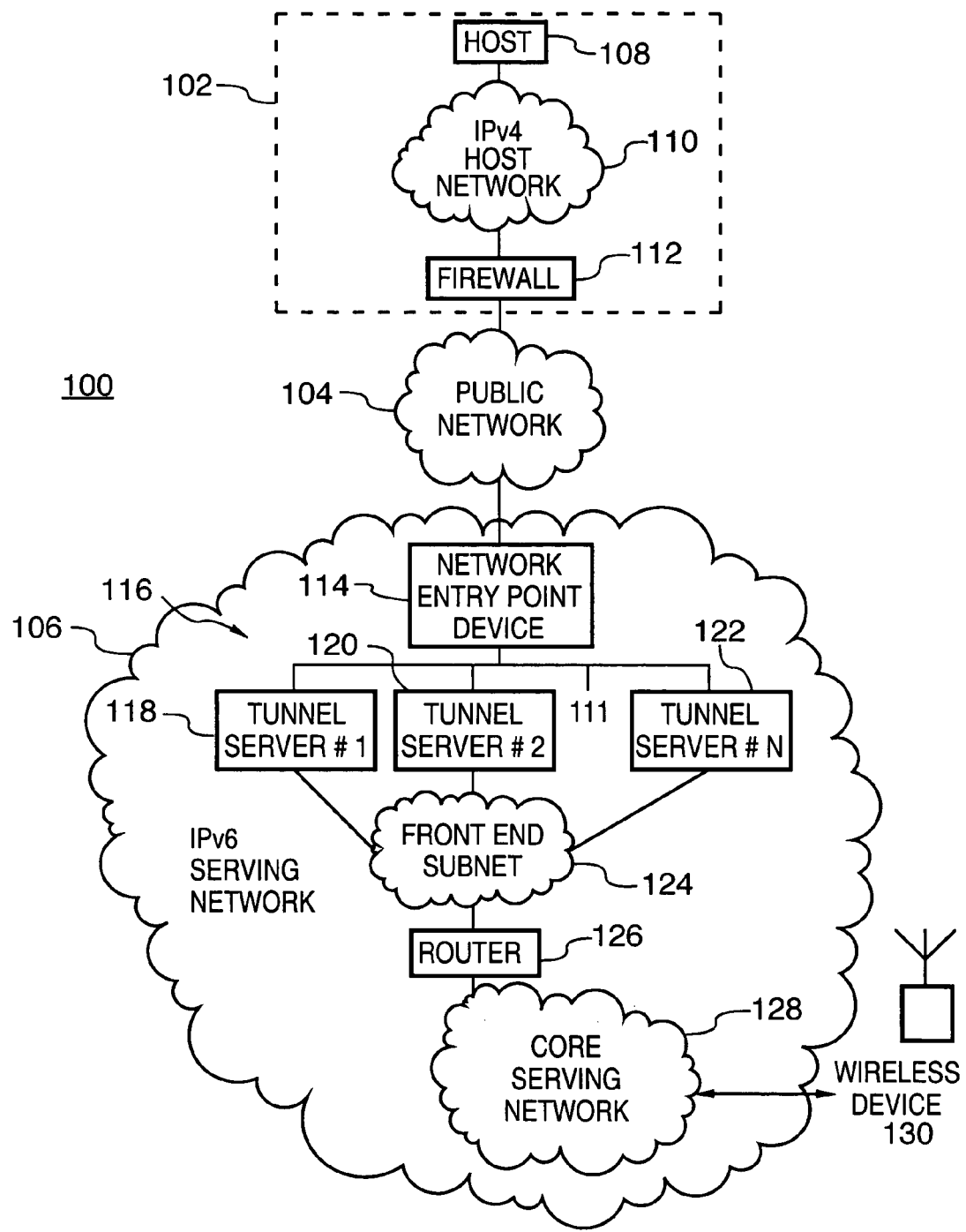
FIG. 1 is an illustration of a communication system in which a first technical aspect of present application may be embodied, which particularly highlights a front end of a serving network.

Referring now to FIG. 1, an illustration of a computer system 100 which highlights the components involved in the first technical aspect of the present application, which relates to the serving network's "front end", is shown. Computer system 100 generally includes a host system 102 and a serving network 106 which communicate through a public network 104 to provide communications for at least one wireless communication device 130.

Host system 102 includes a host computer 108 coupled within a host network 110. In general, communications of user information between host computer 108 and wireless communication device 130 is facilitated through serving network 106. Communications between host system 102 and serving network 106 may be routed through a conventional firewall 112 and public network 104, which may be the Internet. In the present embodiment, host network 110 is an IPv4-addressed network. Public network 104 (e.g. the Internet) may also be an IPv4-addressed network or have components thereof (e.g. routers) that are not yet equipped to handle IPv6 addressing.

Host computer 108 has an application program for receiving user information, processing the user information, and displaying the processed information to the end-user. The user information may be received at host computer 108 by, for example, manual entry through a keyboard or other user suitable interface device in host system 102. This information may be visually displayed in host system 102 on a computer monitor or the like. Preferably, the application program associated with host computer 108 is an e-mail receiving/sending program and/or a calendar/scheduling program. For example, the application program may include the Microsoft Exchange® program available from Microsoft Corporation, or the Lotus Notes® program available from the Lotus Development Corporation. Microsoft Exchange® is a registered trademark of the Microsoft Corporation, and the Lotus Notes® program is a registered trademark of the Lotus Development Corporation.

Host computer 108 operates to send such user information to wireless communication device 130 through serving network 106. More particularly, when new and/or updated information is received by the application program, host computer 108 operates to "push" user information to wireless communication device 130 through serving network 106. Conversely, host computer 108 operates to receive new and/or updated information from wireless communication device 130 and to accordingly update the application program for the end-user. Preferably, wireless communication device 130 operates an application program (e.g. e-mail and/or calendar application) similar to the program on host computer 108 and such that information is synchronized between the devices in real-time.

Preferably, host computer 108 is configured to act on behalf of a plurality of end-users, each of which is associated with a particular wireless communication device. For example, a plurality of personal computers (PC) may be connected to host network 110 and access a network server which may run the application program (e.g. the e-mail program or calendaring program). When new and/or updated information from these programs is received, host computer 108 operates to "push" this information to the appropriate wireless communication device through serving network 106. Preferably, host computer 108 initiates the pushing of information substantially in real time, as the information is received or updated. Similarly, host computer 108 operates to receive user information from each one of the wireless communication devices and to update data for the appropriate end-user for the application program.

Although not shown in FIG. 1 for simplicity and clarity, additional host systems like host system 102 communicate with other wireless communication devices through serving network 106 as well. Such a host system or host computer may be part of a private network or, alternatively, part of a public network.

Referring now to serving network 106 of FIG. 1, a "front end" subnetwork 124 includes a network entry point device 114, a plurality of tunnel servers 116, and a router 126. Front end subnetwork 124 is coupled to a "core" serving network 128 through router 126. Network entry point device 114 and devices in front end subnetwork 124 (e.g. tunnel servers 116) are part of what may be referred to as a "host access network". Core network 128, as its name suggests, is the central core of serving network 106 which helps facilitate the communication of user information to and from wireless communication device 130 through a wireless communication network (not shown in FIG. 1). The dividing point between the front end and the remaining part of serving network 106 is marked by router 126, which routes communications between front end subnetwork 126 and core network 128. In contrast to host network 110 and/or public network 104, serving network 106 (which includes core network 128) is an IPv6 addressed network.

Network entry point device 114 is any device which serves the front end of serving network 106 in order to at least receive and handle initial host requests. Network entry point device 114 appropriately directs communications between devices in public network 104 and tunnel servers 116. In simplest form, network entry point device 114 may be viewed as a switch which helps to facilitate multiple connections between hosts and servers. Preferably, network entry point device 114 is a traffic directing device which receives requests from multiple hosts, distributes the requests amongst multiple servers in the network, and directs subsequent traffic to and from them appropriately.

More preferably, network entry point device 114 is a local director. A local director is a traffic directing device which distributes host requests amongst multiple servers of the network in a load balanced manner, taking into account the availability/unavailability of the servers, and thereafter directs traffic to and from them appropriately. Load balancing techniques evenly distribute connections across multiple servers, giving preference to those servers with the least amount of congestion or use. One local director which may be used is a LocalDirector device which is available from Cisco Systems, Inc., of San Jose, Calif., U.S.A.

In an alternate embodiment, network entry point device 114 is a domain name server (DNS) which uses a round-robin assignment technique. In general, round robin DNS also distributes connection loads across multiple servers. In contrast to a local director methodology, round robin works on a rotating basis such that one server IP address is handed out and placed at the back of the address list, the next server IP address is handed out and placed at the back end of the list, and so on depending on the number of servers being used. This is performed in a continuous loop fashion; the order of assignment is fairly rigid and does take into account the actual loading of each server or its availability.

Tunnel servers 116, which may or may not be co-located, provide access points into serving network 106 for host computers and may be referred to as access servers. Tunnel servers 116 are shown in FIG. 1 to include three (3) tunnel servers 118, 120, and 122 (denoted tunnel servers 1, 2, ..., N, respectively), although any suitable number may be utilized in the system. Each tunnel server 116 is operative to establish and maintain a Transmission Control Protocol (TCP) connection with host computers when such a connection is requested through network entry point device 114. Each tunnel server 116 is also operative to perform a tunneling protocol for establishing tunnel connections with host computers in response to tunnel requests received therefrom.

Tunneling is a method of communicating data between two networks that use different and oftentimes incompatible communication protocols. Tunneling typically involves encapsulating data packets at a source device in one network to provide compatibility when delivered through the other network to a destination device, where the packets are decapsulated to reveal the underlying data packets. In communication system 100, a tunnel connection is established between one of tunnel servers 116 and host computer 108 for connecting the front end of serving network 106 (which is an IPv6 addressed network) to host network 110 (which is an IPv4 addressed network). Once a tunnel server is selected and a tunnel connection is established between a host and the selected tunnel server, network entry point device 114 (e.g. as a local director) performs a Network Address Translation (NAT) function between the host and the tunnel server to facilitate ongoing communications therebetween.

Preferably, each tunnel server 116 is operate to establish and maintain secure tunnel connections in accordance with a Secure Shell (SSH) standard. Such a security protocol may be based on a version of SSH1 or SSH2, or alternatively based on an open SSH standard called OpenSSH developed by the OpenBSD Project (Berkley Software Distribution) such as OpenSSH Version 3.4, Jun. 26, 2002. There are a number of references available on SSH, including the book entitled "*SSH: The Secure Shell, The Definitive Guide*" by Daniel J. Barrett, PhD., and Richard E. Silverman. In general, SSH is a software tool and protocol for secure remote login over networks. It provides an encrypted terminal session with strong authentication of both server and client using public-key cryptography. The features supported with SSH include a variety of user authentication methods; tunneling arbitrary TCP connections through the SSH session; protecting normally insecure protocols (such as Internet Mail Application Protocol or IMAP) and allowing secure passage through firewalls; automatic forwarding of X Windows connections; support for external authentication methods, (including Kerberos and SecurID); and secure file transfers.

In particular, a first level of SSH authentication allows any host to connect to a SSH server as long as the password of the account at the server is known. This procedure will encrypt traffic sent via SSH, but it does not in itself provide a strong mechanism to authenticate the host. A second level of SSH authentication relies on a security key mechanism: a key pair is created and the public key is provided to the server. When connecting to an SSH server, the host sends a request to the server for authentication with use of the security keys. The server looks up the public key in a remote home directory at the server and compares both keys. It then sends an encrypted "challenge" to the host, which is decrypted at the host with the private key and sent back to the server.

As an alternative to SSH, each tunnel server 116 may operate to establish and maintain secure tunnel connections in accordance with Virtual Private Network (VPN) techniques. Such techniques may include a Point-To-Point Tunneling Protocol (PPTP), a Layer 2 Tunneling Protocol (L2TP), and IP Secure Protocol (IPsec), as some examples.

Preferably, host computer 108 and tunnel servers 116 are also operative to encapsulate the datagram protocols based on a Point-to-Point Protocol (PPP) standard. For example, the PPP may be based on the methodology described in "*The Point-to-Point Protocol* (PPP)", Request For Comments (RFC) 1661, issued in July 1994 by the Internet Engineering Task Force (IETF). In general, PPP provides a method for encapsulating datagrams over serial links so that, for example, a PC may connect to the Internet through a telephone line with use of a modem. PPP also provides a Link Control Protocol (LCP) for establishing, configuring, and testing the data-link connection, as well as a family of Network Control Protocols (NCPs) for establishing and configuring different network-layer protocols. PPP session establishment also utilizes three phases which include a link establishment phase, an (optional) authentication phase, and a network-layer protocol phase, which use known methodologies. Together, as apparent from the above-description, the preferable connection between host computer 108 and a tunnel server is a "tunneled PPP over SSH over TCP" connection.

Tunnel servers 116 and router 126 are also operative to perform dynamic routing functions for the front end of serving network 106. Preferably, these routing functions include a dynamic routing protocol (DRP) utilized in front end subnetwork 124. Conventionally, a "dynamic" routing of data through a network exploits the likelihood that the appropriate or best route for sending data packets between two devices through a network may change over time. A dynamic routing protocol is a protocol utilized in network routing devices for automatically and regularly determining, updating, and communicating within the network what the appropriate or best routes are between network devices, so that these routes may be used when data packets are sent through the network.

For use in connection with the DRP, each one of tunnel servers 116 and router 126 has a local routing table in its memory which associates an IP address of a destination device with an IP address of an appropriate or best adjacent routing device. Per the DRP, when connections change, updates are made to the local routing tables through broadcasts by the routing devices. If a new tunnel connection is established between tunnel server 118 and host computer 108, for example, tunnel server 118 updates its local routing table to reflect the new relationship. It then broadcasts the updated routing table information to the other tunnel servers 116 and router 126 so that, for example, router 126 will direct user information destined to host computer 108 through tunnel server 118.

Preferably, the DRP is based on an Open Shortest Path First (OSPF) standard developed by the IETF. OSPF is generally classified as an Internal Gateway Protocol (IGP) as it is designed to distribute routing information between routers of a single autonomous system. OSPF is a link-state algorithm which specifies a class of messages called link-state advertisements (LSAs) which are used by routers to update each other about the network links. Link-state updates are stored in a topology database which contains a representation of every link and router in the network. One current standard for OSPF is OSPF Version 2 developed by the IETF and documented in RFC 1247, July 1991, which is hereby incorporated by reference herein. Using such a DRP, updates to routing tables are made periodically (e.g. every 30 minutes) as well as when a link change is observed in the network.

Although use of OSPF is advantageous, any other suitable dynamic routing protocol may be utilized. A Routing Information Protocol (RIP) or a Border Gateway Protocol (BGP), as examples, may deemed suitable depending on the implementation. In contrast to OSPF, RIP utilizes a distance-vector algorithm where each router precomputes the best links and broadcasts its entire routing database periodically (e.g. every 30 seconds) to all other routers in the network. One current standard for RIP is RIP Version 2 developed by the IETF and documented in RFC 2453, November 1998, which is hereby incorporated by reference herein. One current standard for BGP, which is based on a most specific prefix and shortest Autonomous System (AS) path, is BGP Version 4 developed by the IETF and documented in RFC 1771.

Figure 2:
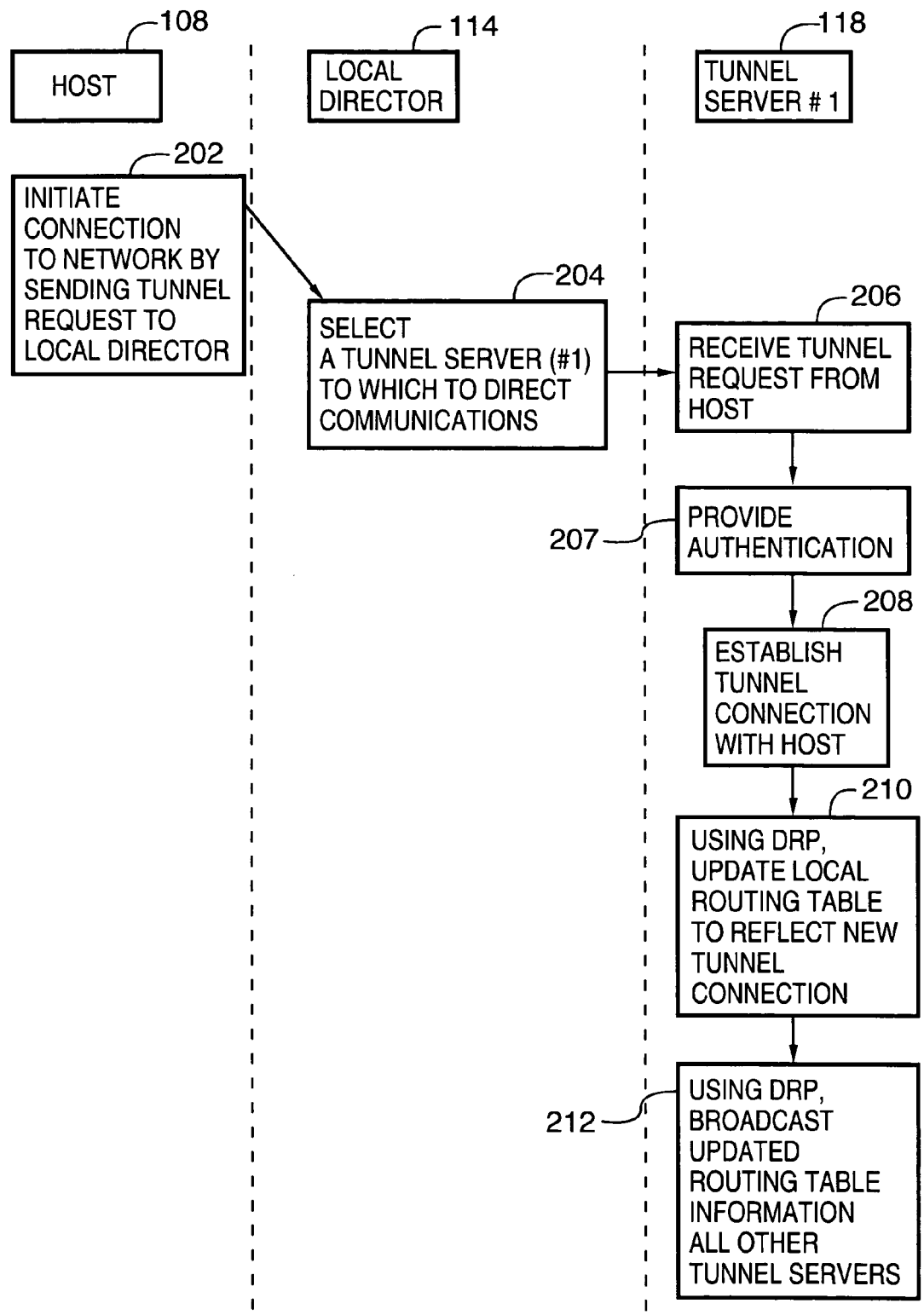
FIG. 2 is a flow diagram which describes a method of facilitating communication of user information between a host computer and at least one wireless communication device through the serving network of FIG. 1.
Figure 3:
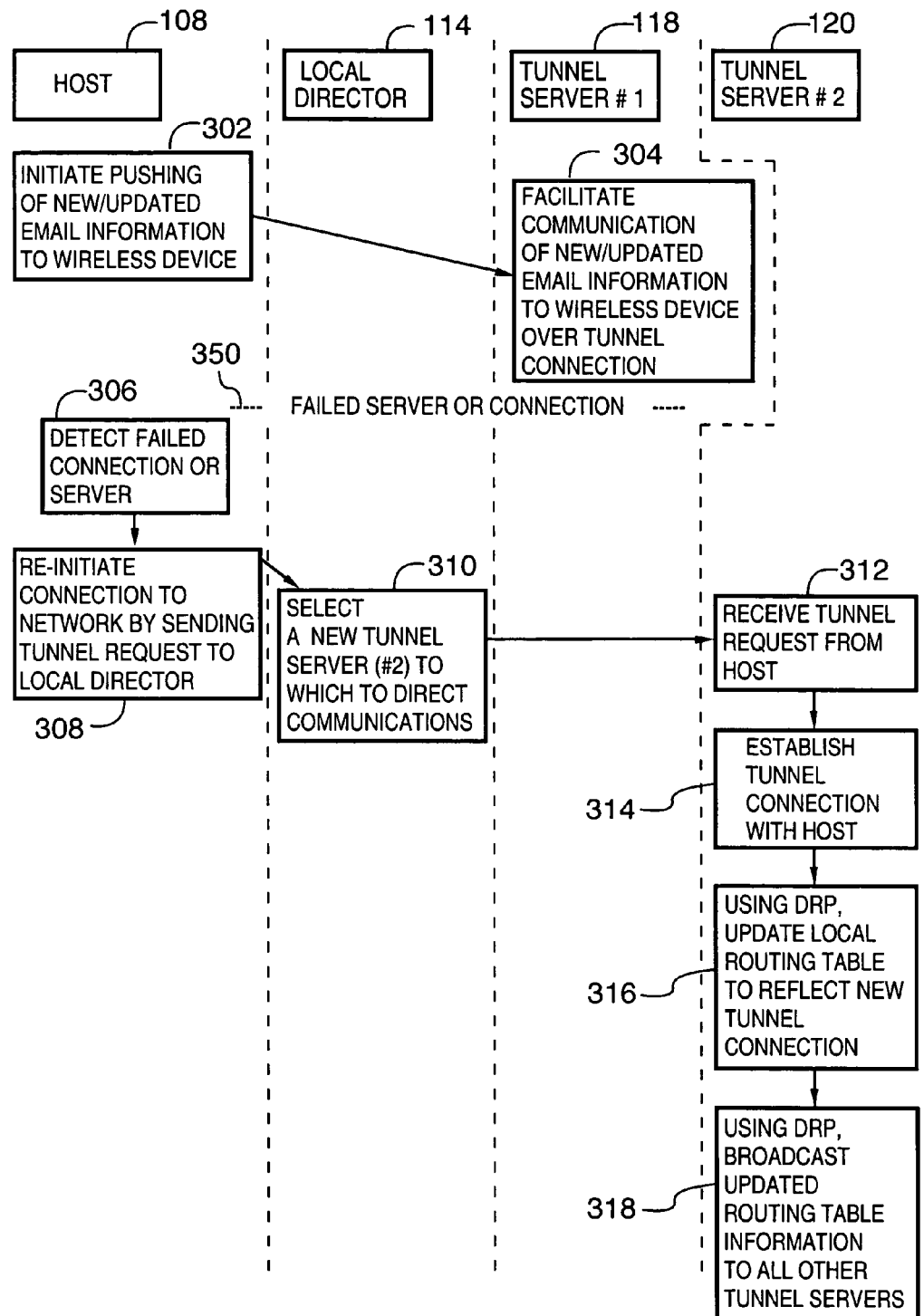
FIG. 3 is another flow diagram associated with FIG. 2 which describes a continued method of facilitating communication of user information between the host computer and the wireless communication device through the serving network of FIG. 1.

FIGS. 2 and 3 are flow diagrams which are used to describe a method of facilitating communication of user information between a host computer and a wireless communication device through a serving network. Such methods may be utilized in connection with host computer 108, serving network 106, and wireless communication device 130 of FIG. 1. More particularly, FIG. 2 relates to an initial connection setup between a host computer and a serving network; FIG. 3 relates to communication of user information, detection of a communication failure, and a connection re-establishment between the host computer and the serving network. Such methods may be embodied in a computer program product which includes a computer storage medium and computer instructions stored on the computer storage medium, where the computer instructions can be executed to perform the methods.

In the following description of the flow diagram of FIG. 2, FIGS. 1-2 are referred to in combination. Host computer 108 initiates a connection to serving network 106 by sending a tunnel request to network entry point device 114 (step 202 of FIG. 2). Network entry point device 114 receives this request from host computer 108 and, in response, selects one of the plurality of tunnel servers 116 to which to direct communications with host computer 108 (step 204 of FIG. 2). In the present example, network entry point device 114 particularly selects tunnel server 118 to which to direct communications with host computer 108. Tunnel server 118 receives this tunnel request from host computer 108 through network entry point device 114 (step 206 of FIG. 2). In response to receiving the tunnel request, tunnel server 118 provides any necessary authentication (step 207 of FIG. 2) and establishes a tunnel connection with host computer 108 (step 208 of FIG. 2) assuming the authentication is successful.

Although described above as involving a single host computer 108, steps 202-208 described in relation to FIG. 2 are actually performed contemporaneously in connection with a plurality of host computers which, over some period of time, send a plurality of tunnel requests through network entry point device 114. Accordingly, network entry point device 114 performs selection of a tunnel server in step 204 in a manner such that all tunnel connections are distributed amongst all tunnel servers 116 (using, for example, a round robin DNS or a local director). Preferably, the distribution is performed in a substantially evenly or equal manner amongst all tunnel servers 116 that are available (using, for example, the local director). This selection may be performed in network entry point device 114 utilizing conventional load balancing techniques.

The tunnel connection established in step 208 is a "long live" connection which is utilized to facilitate the communication of user information between host computer 108 and wireless communication device 130, as well as between host computer 108 and any other wireless communication devices associated with the application program in host system 102. In the present embodiment, the tunnel connection established in step 208 has connection points at host computer 108 and tunnel server 118 for connecting host network 110 (an IPv4-addressed network) to the front end of serving network 106 (an IPv6-addressed network). When sending data packets from host computer 108 to wireless communication device 130 through tunnel server 118, the tunneling protocol at host computer 108 involves "wrapping" or encapsulating IPv6-addressed data packets (i.e. addressed to wireless communication device 130) within IPv4-addressed data packets. When tunnel server 118 receives these data packets from host computer 108, the tunneling protocol at tunnel server 118 involves "unwrapping" or decapsulating the IPv4-addressed data packets to reveal the underlying IPv6-addressed data packets. These IPv6-addressed data packets are subsequently sent to wireless communication device 130 through router 126 and core subnetwork 128.

Conversely, data packets are also sent from wireless communication device 130 to host computer 108 through tunnel server 118 over the tunnel connection. In this case, tunnel server 118 receives IPv6-addressed data packets (i.e. addressed to host computer 108) from wireless communication device 130. The tunneling protocol at tunnel server 118 involves wrapping or encapsulating these IPv6-addressed data packets within IPv4-addressed data packets. When host computer 108 receives these data packets, the tunneling protocol at host computer 108 involves unwrapping or decapsulating the IPv4-addressed data packets to reveal the underlying IPv6-addressed data packets. User information in these underlying data packets are subsequently directed for storage with the appropriate end-user data associated with that address.

As described earlier above, tunnel server 118 is also configured to perform a dynamic routing protocol (DRP) in front end subnetwork 124. Thus, after establishing the tunnel connection in step 208 of FIG. 2, tunnel server 118 uses its DRP to update its local routing table to reflect the new tunnel connection (step 210 of FIG. 2). The update to the local routing table at tunnel server 118 involves storing an IP address of tunnel server 118 in association with a destination IP address to host computer 108. Tunnel server 118 also uses the DRP to broadcast this updated routing table information to all other tunnel servers 116 and router 126. The broadcasting of updated routing table information may be performed in response to identifying a newly established connection, or it may be performed periodically over time, or both. When updated routing table information is broadcasted from tunnel server 118 and received at other tunnel servers 116 and router 126, other tunnel servers 116 and router 126 update their own local routing tables to reflect the new tunnel connection.

In this way, when a communication of user information intended for host computer 108 is received at router 126, for example, router 126 examines its local routing table to identify that tunnel server 118 is responsible for communications with host computer 108. Thus, router 126 routes the user information to tunnel server 118 so that tunnel server 118 may communicate it to host computer 108 over the tunnel connection.

With the entry point connection now established, basic steady-state operation is now described in relation to FIG. 3. Host computer 108 initiates a "pushing" of new and/or updated user information (e.g. e-mail information) to wireless communication device 130 by sending this information to tunnel server 118 over the tunnel connection (step 302 of FIG. 3). Tunnel server 118 receives this new and/or updated information over the tunnel connection through network entry point device 114. Tunnel server 118 facilitates the communication of the new and/or updated user information to wireless communication device 130 over the tunnel connection (step 304 of FIG. 3), executing its tunneling protocols and appropriately routing the information.

However, there are times when the connection between host computer 108 and tunnel server 118 may fail or otherwise become unavailable. For example, tunnel server 118 may be intentionally taken "off-line", lose supply power, exhibit a technical failure, or become excessively loaded; or the communication channel or tunnel connection may itself be interrupted by interference or some other disruption. Thus, a communication failure or unavailable connection between host computer 108 and tunnel server 118 may exist, as is illustrated in FIG. 3 at a point 350.

Host computer 108 is configured to detect such a communication failure between it and tunnel server 118 (step 306 of FIG. 3). This detection may be performed in any number of suitable ways. For example, after host computer 108 attempts to send data packets through serving network 106, it may detect such a condition in response to failing to receive an acknowledgement or response, or receiving a "Destination Unreachable", "Message Undeliverable", or "Server Unavailable" message. As another example, host computer 108 may detect such a condition in response to failing to receive one or more "heartbeats" or "keep alive" messages from tunnel server 118 which are otherwise regularly or periodically sent.

In response to detecting the communication failure, host computer 108 attempts to reinitiate or reestablish a connection with serving network 106. Host computer 108 does this by sending a tunnel request through network entry point device 114 (step 308 of FIG. 3). In general, this step 308 uses the same process performed in step 202 of FIG. 2. Network entry point device 114 receives this request from host computer 108 and, in response, selects one of the plurality of tunnel servers 116 to which to direct communications with host computer 108 (step 310 of FIG. 3). In the present example, network entry point device 114 particularly selects tunnel server 120 (not tunnel server 118 where communication is no longer possible) to which to direct communications with host computer 108.

Thus, tunnel server 120 receives this new tunnel request from host computer 108 through network entry point device 114 (step 312 of FIG. 3). In response to receiving the tunnel request, tunnel server 120 establishes a tunnel connection with host computer 108 (step 314 of FIG. 3) after performing a successful authentication procedure. The tunnel connection established in step 314 is a "long live" connection used to facilitate the communication of user information between host computer 108 and wireless communication device 130, as well as between host computer 108 and any other wireless communication devices associated with the application program in host system 102.

As with each one of tunnel servers 116, tunnel server 120 is configured to perform the DRP in front end subnetwork 124. Thus, tunnel server 120 uses its DRP to update its local routing table to reflect the newly established tunnel connection (step 316 of FIG. 3). The update to the local routing table at tunnel server 120 involves storing an IP address of tunnel server 120 in association with a destination IP address to host computer 108. Tunnel server 120 also uses the DRP to broadcast updated routing table information to all other tunnel servers 116 and router 126 (step 318 of FIG. 3). The broadcasting of routing table information may be performed in response to identifying a newly established connection, or it may be performed periodically over time, or both. When updated routing table information is broadcasted from tunnel server 120 and received at other tunnel servers 116 and router 126, the other tunnel servers 116 and router 126 update their own local routing tables to reflect the new tunnel connection. In general, steps 312-318 of FIG. 3 use the same processes as steps 206-212 of FIG. 2, except that steps 312-318 are shown as being performed by tunnel server 120 rather than tunnel server 118.

In this way, when a communication of user information from wireless communication device 130 for host computer 108 is received at router 126, for example, router 126 examines its local routing table to identify that tunnel server 120 is now responsible for communications with host computer 108. Thus, router 126 routes the user information to tunnel server 120 so that tunnel server 120 may communicate it to host computer 108 over the newly established tunnel connection. Also, host computer 108 may again initiate a "pushing" of new and/or updated user information (e.g. e-mail information) to wireless communication device 130 by sending such information now to tunnel server 120 over the tunnel connection. Tunnel server 120 receives this new and/or updated information over the tunnel connection through network entry point device 114. Tunnel server 120 facilitates the communication of the new and/or updated user information to wireless communication device 130 over the tunnel connection, executing its tunneling protocols and appropriately routing the information.

Although the methods described in relation to FIGS. 2 and 3 are described as being performed in connection with a single host computer 108 and tunnel server 118/120, each one of tunnel servers 116 is actually configured to contemporaneously maintain other tunnel connections with other host computers in the same manner and use, as well as perform the DRP. Also, the methods are contemporaneously performed between other host computers of other host systems and other tunnel servers 116 in serving network 106.

As apparent from the description of FIGS. 1-3, the front end of the network is advantageously configured to provide for scalability and fault tolerance, as well as for IPv4-to-IPv6 address transitioning, for push-based systems.

Figure 4:
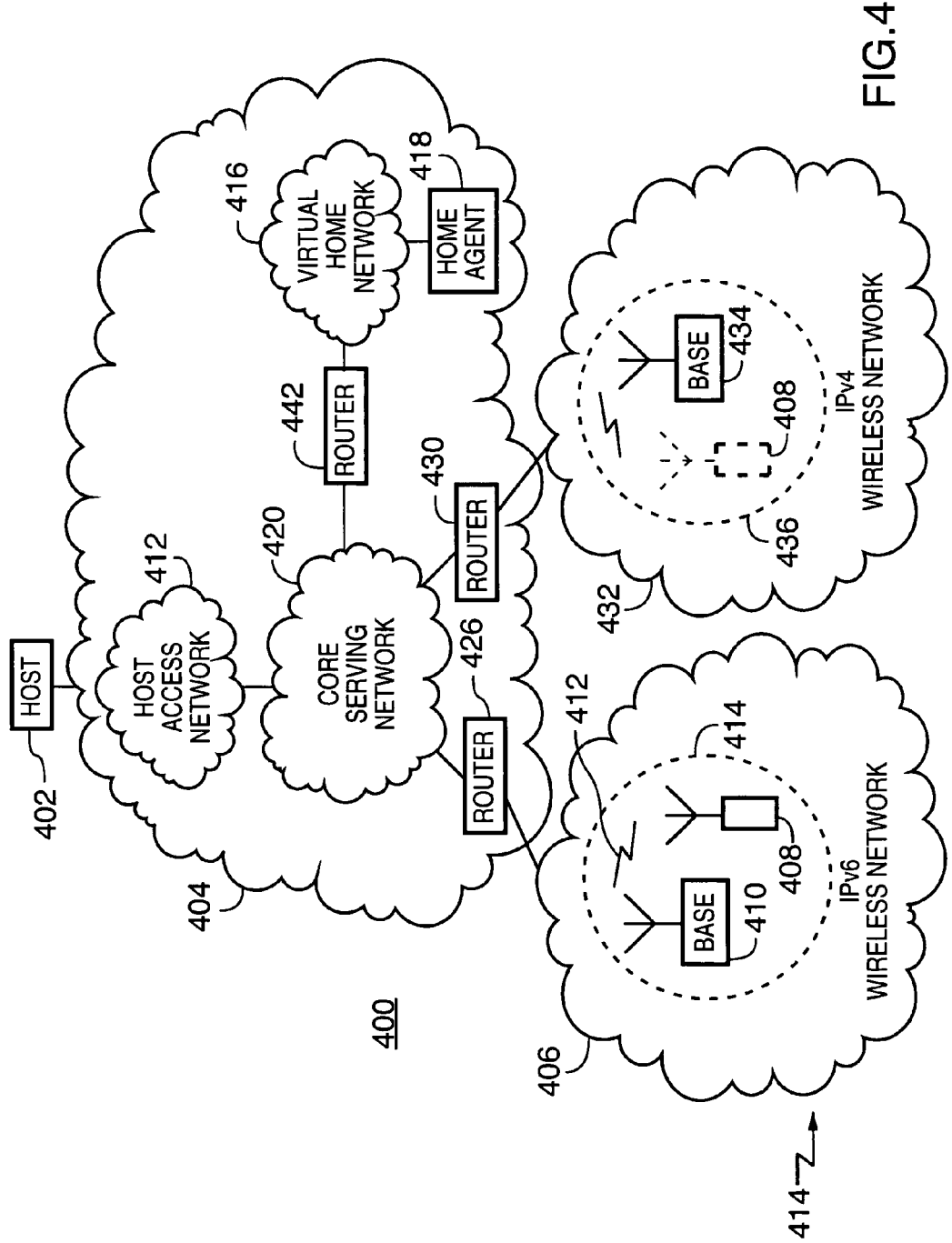
FIG. 4 is an illustration of a communication system in which a second technical aspect of the present application may be embodied, which particularly highlights a back end of a serving network.

FIG. 4 is an illustration of a communication system 400 which highlights the components involved for the second technical aspect of the present application, which relates to the serving network's "back end". Communication system 400 generally includes a host computer 402 and at least one wireless communication device 408 which communicate user information through a serving network 404. Host computer 402 may reside in and/or communicate through an IPv4 communication network. In addition, host computer 402 may communicate with serving network 404 through a public network, such as an Internet (not shown in FIG. 4). Preferably, host computer 402 has the same environment and functionality as described in relation to FIG. 1 (host computer 108).

Serving network 404, which is an IPv6 communication network, includes a host access network 412 and a core serving network 420. In simplest form, host access network 412 includes any means for providing a host computer with access and connectivity to serving network 404. Preferably, host access network 412 includes a network entry point device and tunnel servers as described above in relation to FIGS. 1-3 (network entry point device 114 and tunnel servers 116 of FIG. 1). Core network 420, as its name suggests, is the central core of serving network 404 which helps facilitate the communication of user information to and from wireless communication device 408 through one of a plurality of wireless communication networks 414.

The plurality of wireless networks 414 shown in FIG. 4 include two (2) wireless communication networks, namely, a wireless communication network 406 and a wireless communication network 432 are shown. Wireless network 406 may be the "home" network of wireless device 408. Wireless network 406 has at least one base station 410 and a geographic coverage area 414 within which wireless device 408 may communicate with base station 410. Similarly, wireless network 432 has at least one base station 434 and a geographic coverage area 436 within which wireless device 408 may communicate with base station 434. Wireless network 406 and serving network 404 are able to communicate information to each other through a router 426 which is coupled to core network 420. Similarly, wireless network 432 and serving network 404 are able to communicate information to each other through a router 430 which is also coupled to core network 420.

In the embodiment described, wireless network 406 is an IPv6 wireless data communication network and wireless network 432 is an IPv4 wireless data communication network. Preferably, wireless networks 414 are packet-switched data communication networks. For example, wireless networks 414 may be General Packet Radio Service (GPRS) networks. Although only two wireless networks are shown in FIG. 4 for clarity and simplicity, a large number of wireless networks exist in actual practice.

Also shown in FIG. 4 is a home agent 418 of a virtual home network 416 in serving network 404. Core network 420 and virtual home network 416 are able to communicate information to each other through a router 428. In an alternative configuration, virtual home network 416 and home agent 418 are not part of serving network 404, but rather are outside of serving network 404 or within IPv6 wireless network 406. Home agent 418 is used and accessed when wireless device 408 is outside of its home network and information needs to be conveyed to wireless device 408.

Figure 5:
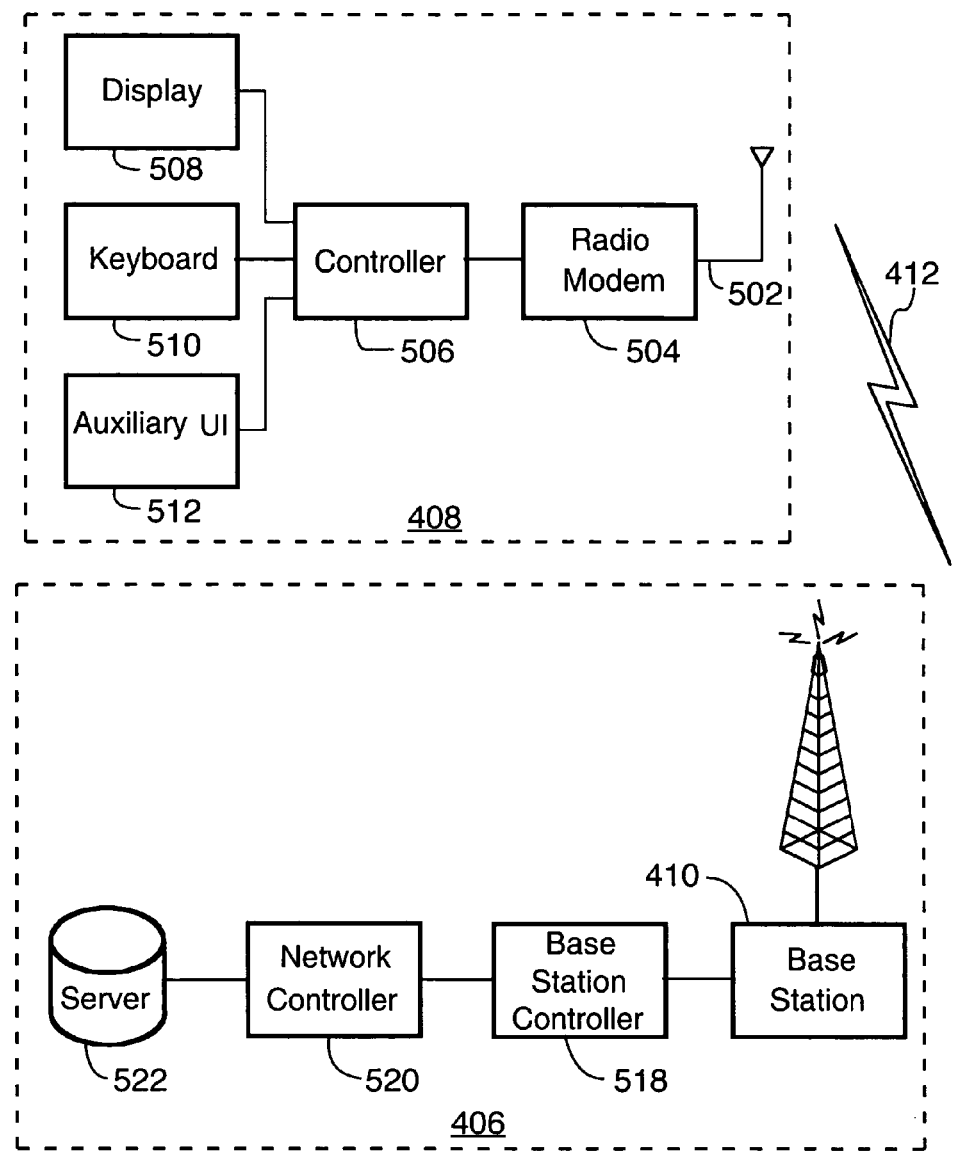
FIG. 5 is a block diagram illustration of a wireless network and a wireless device which communicates through the wireless network.

FIG. 5 is a block diagram of relevant portions of wireless network 406 and wireless device 408 of FIG. 4. Wireless network 406 is also representative of other wireless networks through which wireless device 408 may communicate. Wireless network 406 includes base station 410 (including antenna tower), a base station controller 518, a network controller 520, and a server 522. Server 522 may be any component or system connected within or to network 406. For example, server 522 may be a service provider system which provides wireless communication services to wireless device 408 and stores data required for routing a communication signal to wireless device 408. Server 522 may also be a gateway to other networks, including but in no way limited to a telephone network, a local area network, or a wide area network, such as the Internet. Those skilled in the art to which the instant application pertains will appreciate that although only a single server 522 is shown in FIG. 5, a typical communication network may include further additional network storage, processing, routing and gateway components.

Network controller 520 normally handles routing of communication signals through network 406 to a destination device (such as wireless device 408). In the context of a packet-switched communication network, such as a GPRS based network, network controller 520 must determine a location or address of the destination wireless device and route packets for the wireless device through one or more routers or switches (not shown) and eventually to a base station (such as base station 410) serving a network coverage area in which the wireless device is currently located.

Base station 410 and its associated controller 518 provide wireless network coverage for a particular coverage area commonly referred to as a "cell". Base station 410 transmits communication signals to and receives communication signals from wireless devices within its cell via the antenna. Base station 410 normally performs such functions as modulation and possibly encoding and/or encryption of signals to be transmitted to the mobile device in accordance with particular, usually predetermined, communication protocols and parameters, under the control of base station controller 518. Base station 410 similarly demodulates and possibly decodes and decrypts, if necessary, any communication signals received from wireless device 408 within its cell. Communication protocols and parameters may vary between different networks. For example, one network may employ a different modulation scheme and operate at different frequencies than other networks.

Those skilled in the art will appreciate that, in actual practice, a wireless network may include hundreds of cells, each of which is served by a distinct base station controller 518, base station 410 and transceiver, depending upon the desired overall expanse of network coverage. All base station controllers and base stations may be connected by multiple switches and routers (not shown), controlled by multiple network controllers, only one of which is shown in FIG. 5. Similarly, as described above, wireless network 406 may also include a plurality of servers 522, including for example storage, routing, processing and gateway components.

Thus, the term "wireless network" is used herein to denote the fixed portions of the network, including RF transceivers, amplifiers, base station controllers, network servers, and servers connected to the network. Those skilled in the art will appreciate that a wireless network may be connected to other systems, possibly including other networks, not explicitly shown in FIG. 5. Such a wireless network will normally be transmitting at the very least some sort of paging and system information on an ongoing basis, even if there is no actual packet data exchanged. Although the wireless network consists of many parts, these parts all work together to result in a certain behavior at the wireless link.

Wireless communication device 408 preferably has a display 508, a keyboard 510, an possibly one or more auxiliary user interfaces (UI) 512, each of which are coupled to a controller 506, which in turn is connected to a modem 504 and an antenna 502. Wireless device 408 sends communication signals to and receives communication signals through wireless network 406 over wireless link 412 via antenna 502. Radio modem 504 performs functions similar to those of base station 410, including for example modulation/demodulation and possibly encoding/decoding and encryption/decryption. It is also contemplated that modem 504 may perform certain functions in addition to those that are performed by base station 410. Where the information in a communication signal or packet is confidential and can be decrypted only at a destination mobile device, for example, base station 410 may not encrypt a received packet which contains information that has been previously encrypted, whereas the radio modem may decrypt such encrypted information. It will be apparent to those skilled in the art that the radio modem will be adapted to the particular wireless network or networks in which the wireless device 408 is intended to operate.

In most modern communication devices, controller 506 will be embodied as a central processing unit or CPU running operating system software which is stored in a mobile device memory component (not shown). Controller 506 will normally control overall operation of the wireless device 408, whereas signal processing operations associated with communication functions are typically performed in the modem 504. Controller 506 interfaces with device display 508 to display received information, stored information, user inputs and the like. Keyboard 510, which may be a telephone type keypad or full alphanumeric keyboard, possibly with auxiliary input components, is normally provided on wireless devices for entering data for storage on the wireless device, information for transmission from the wireless device to the network, a telephone number to place a call from the wireless device, commands to be executed on the wireless device, and possibly other or different user inputs.

Thus, the term "wireless device" is used herein in reference to a wireless mobile communication device. The wireless device may consist of a single unit, such as a data communication device, a cellular telephone, a multiple-function communication device with data and voice communication capabilities for example, a personal digital assistant (PDA) enabled for wireless communication, or a computer incorporating an internal modem, but may instead be a multiple-module unit, comprising a plurality of separate components, including but in no way limited to a computer or other device connected to a wireless modem. In the wireless device block diagram of FIG. 5, for example, modem 504 and antenna 502 may be implemented as a radio modem unit that may be inserted into a port on a laptop computer, which would include display 508, keyboard 510, possibly one or more auxiliary UIs 512, and controller 506 embodied as the computer's CPU. It is also contemplated that a computer or other equipment not normally capable of wireless communications may be adapted to connect to and effectively assume control of the radio modem 504 and antenna 502 of a single-unit device such as one of those described above. Although only a single device 408 is shown in FIG. 5, it will be obvious to those skilled in the art to which this application pertains that many devices, including different types of devices, may be active or operable within a wireless communication network at any time.

Figure 6:
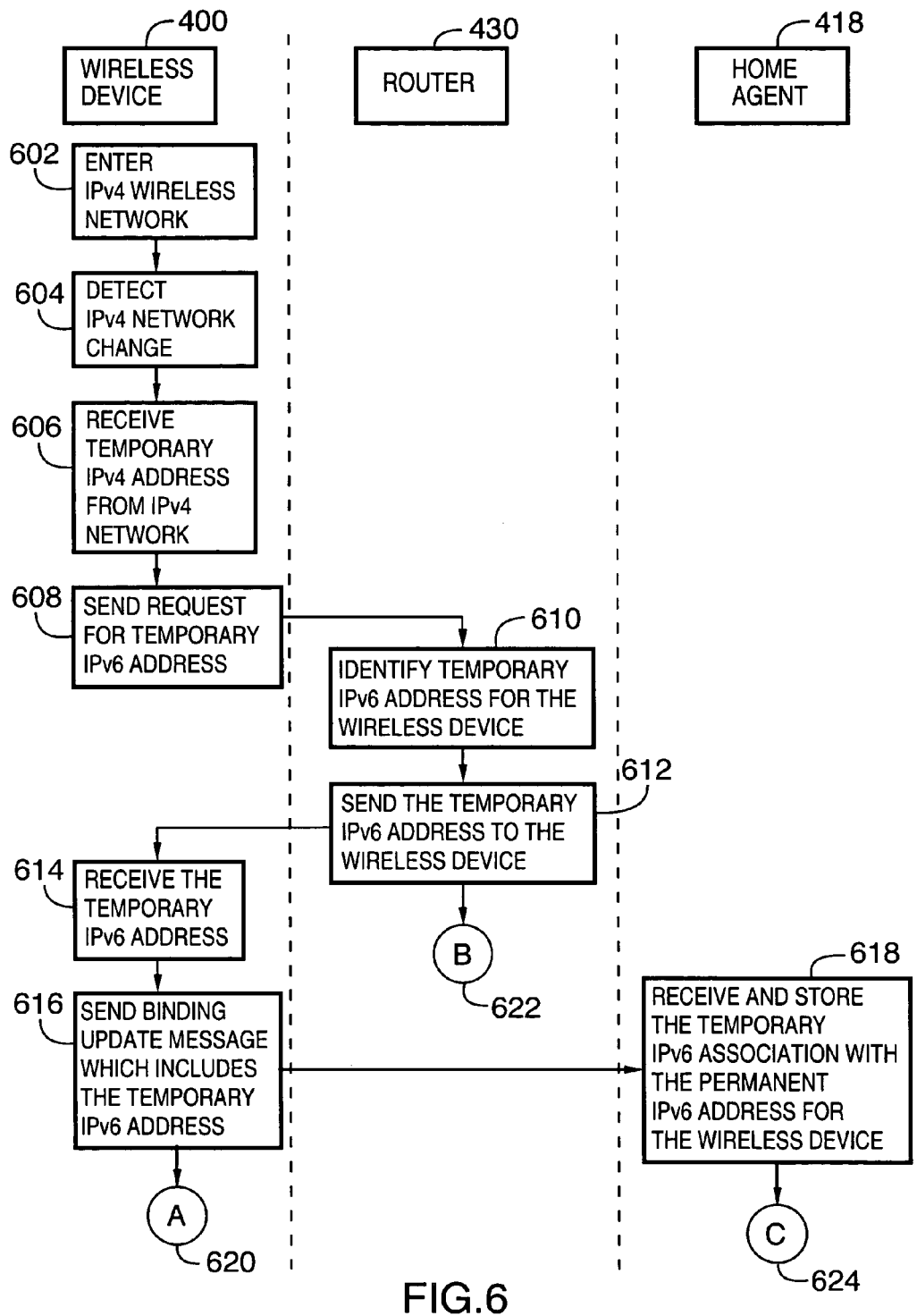
FIG. 6 is a flow diagram which describes a method of facilitating communication of user information between a host computer and at least one wireless communication device through the serving network of FIG. 4.
Figure 7:
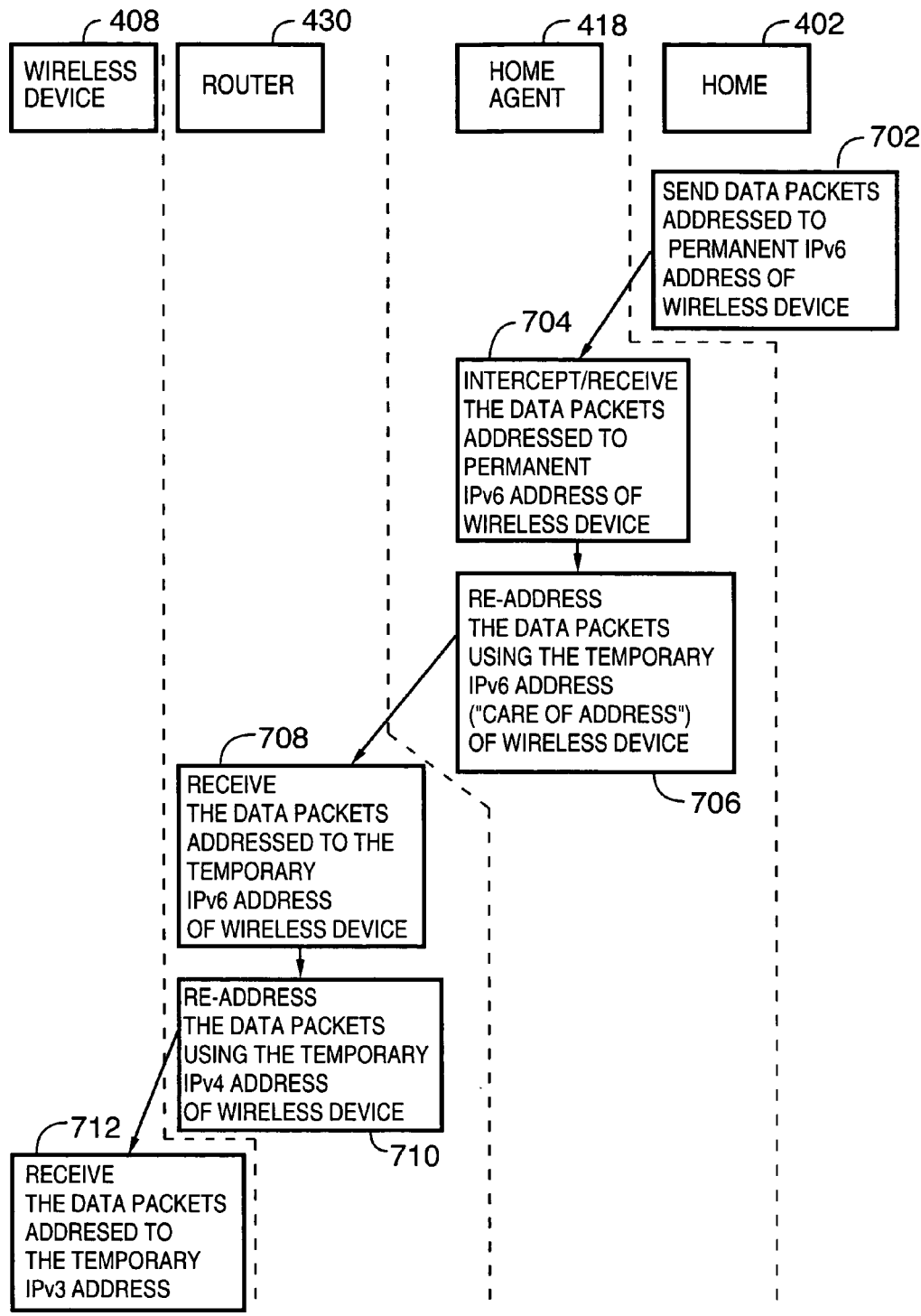
FIG. 7 is another flow diagram related to FIG. 6 which describes a continued method of facilitating communication of user information between a host computer and the wireless communication device through the serving network of FIG. 4.

FIGS. 6 and 7 are flow diagrams which are used to describe a method of facilitating communication of user information between a host computer and a wireless communication device through a serving network. Such methods may be utilized in connection with host computer 402, serving network 404, and wireless communication device 408 of FIG. 4. More particularly, FIG. 6 relates to an initial setup or establishment of communication between a wireless communication device and a serving network; and FIG. 7 relates to the communication of user information between the host computer and the serving network. Such methods may be embodied in a computer program product which includes a computer storage medium and computer instructions stored on the computer storage medium, where the computer instructions can be executed to perform the methods.

In the following description of the flow diagram of FIG. 6, FIGS. 4 and 6 are referred to in combination. The method begins with wireless device 408 operating within and through IPv6 wireless network 406 of FIG. 4. Since wireless device 408 is mobile, however, it is eventually moved to a different location outside coverage area 414 of IPv6 wireless network 406. Wireless device 408 scans all compatible and available wireless networks within which to operate in its new location. Eventually, wireless device 408 determines that it should operate within coverage area 436 of IPv4 wireless network 432 and maintain communications with base station 434. Thus, wireless device 408 "enters" IPv4 wireless network 432 for communications (step 602 of FIG. 6). Wireless device 408 also detects that it has switched to this IPv4 wireless network (step 604). Wireless device 408 may detect this change by signals available in the wireless network, for example, the device may determine that it has roamed to another provider. When roaming to another provider, the device can request IPv6 and IPv4 connectivity to determine which is supported.

When wireless device 408 enters IPv4 wireless network 432, IPv4 wireless network 432 sees to assigning a temporary IPv4 address to wireless device 408. Once assigned, wireless device 408 receives the temporary IPv4 address through IPv4 wireless network 432 (step 606 of FIG. 6). The IPv4 address assignment may be performed using, for example, a Dynamic Host Configuration Protocol (DHCP) server. DHCP is a well-known protocol which uses a defined pool of IP addresses (i.e. a "scope") which are temporarily assigned or "leased" to clients. Addresses are leased for limited periods of time such that an IP address that is not used lease duration is put back into the unallocated pool. Not only are IP addresses handed out, but all related configuration settings like the subnet mask, default router, DNS server, that are required to make TCP/IP work correctly.

Wireless device 408 then transmits a request for a temporary IPv6 address through IPv4 wireless network 432 (step 608 of FIG. 6). This request is delivered to router 430 of serving network 404 which handles the request. In response, router 430 identifies or determines a temporary IPv6 address to assign to wireless device 408 (step 610 of FIG. 6). Router 430 sends a response message to wireless device 408 which includes this newly assigned temporary IPv6 address (step 612 of FIG. 6).

Preferably, router 430 identifies or determines a temporary IPv6 address for wireless device 408 based on the temporary IPv4 address of wireless device 408. More particularly, router 430 determines a temporary IPv6 address by embedding the temporary IPv4 address within additional IPv6 address information. Thus, the new temporary IPv6 address for wireless device 408 preferably has the temporary IPv4 address embedded within it.

Figure 8:
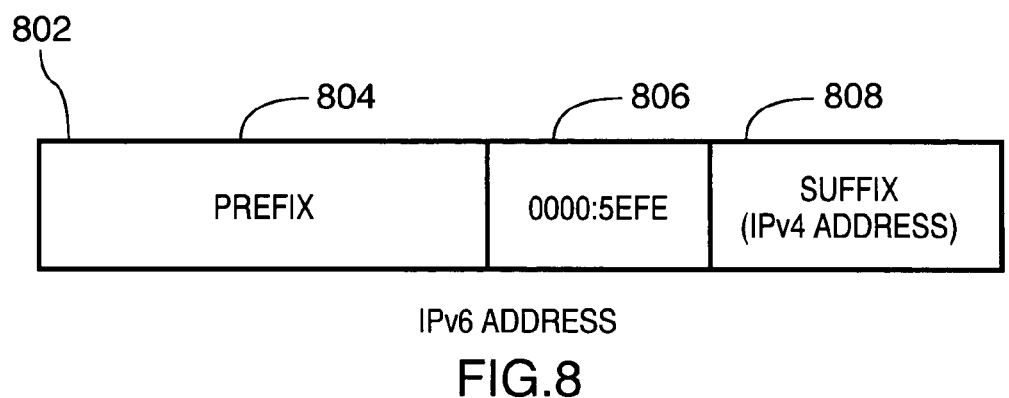
FIG. 8 is a particular message format for IPv6 addressing which may be utilized for the system described in relation to FIGS. 4-7.

More preferably, router 430 operates in accordance with an Intra-Site Automatic Tunnel Addressing Protocol (ISATAP) standard and identifies a temporary IPv6 address in accordance with ISATAP. Referring to FIG. 8, the format of a temporary IPv6 address 802 using the ISATAP is shown. The format of temporary IPv6 address 802 includes a prefix data field 804, a suffix data field 808, and another data field 806. Suffix data field 808 is for an IPv4 address, which in this embodiment is the temporary IPv4 address previously assigned to wireless device 408 through IPv4 wireless network 432.

In general, ISATAP provides for the connection of IPv6 hosts and routers within IPv4 sites. More specifically, ISATAP provides a transition mechanism for enabling an incremental deployment of IPv6 by treating an IPv4 site's IPv4 infrastructure as a Non-Broadcast Multiple Access (NBMA) link layer. As described, ISATAP mechanisms use an IPv6 interface identifier format that embeds an IPv4 address (and tunneling an IPv6 payload in an IPv4 packet); this enables automatic IPv6-in-IPv4 tunneling within a site, whether that site uses globally-assigned or private IPv4 addresses. One document which explains the protocol in detail is the ISATAP Internet-Draft, draft-ietf-ngtrans-isatap-04.txt, of F. Templin, 18 Apr. 2002.

Referring back to the flow diagram of FIG. 6, wireless device 408 receives the newly assigned temporary IPv6 address from router 426 (step 614 of FIG. 6). After receiving it, wireless device 408 sends a message to notify the network of its new temporary IPv6 address (step 616 of FIG. 6). This message may be what is referred to as a "Binding Update" (BU) message. The Binding Update message is sent through virtual home network 416 and received at home agent 418. Home Agent 418 stores the temporary IPv6 address in association with the permanent IPv6 address of wireless device 408 (step 618 of FIG. 6). Thus, the temporary IPv6 address of wireless device 408 becomes a Care-Of Address (COA) of the device at home agent 418.

The method continues using the flow diagram of FIG. 7, where the description makes reference to FIGS. 4 and 7 in combination. The method continues where a communicating device, such as host computer 402, has particular information (e.g. e-mail information) to be pushed to wireless device 408. With its connection to serving network 404 already established, host computer 408 sends data packets addressed to the permanent IPv6 address of wireless device 408 (step 702 of FIG. 7). The data packets addressed to the permanent IPv6 address of wireless device 408 are intercepted and received at home agent 418 in virtual home network 416 (step 704 of FIG. 7). Home agent 418 readdresses these data packets with the Care-Of Address (COA) (step 706 of FIG. 7), which is in this application the temporary IPv6 address generated from wireless device 408 operating in IPv4 wireless network 432. Thus, the data packets are readdressed with the temporary IPv6 address of wireless device 408 and sent out for delivery to wireless device 408.

Router 430 receives the data packets addressed to the temporary IPv6 address (step 708 of FIG. 7). Router 430 encapsulates these data packets with the temporary IPv4 address of wireless device 408 previously assigned to wireless device 408 through wireless network 432 (step 710 of FIG. 7). Router 430 sends these encapsulated data packets out through IPv4 wireless network 432 (step 710). Preferably, this step is performed in accordance with the ISATAP. The wireless device 408 receives the data packets addressed to its temporary IPv4 address and processes the information (e.g. the e-mail information) contained therein.

When wireless device 408 leaves IPv4 wireless network 432 and returns to IPv6 wireless network 406, for example, no longer needed are the temporary IPv4 address, the temporary IPv6 address, and Care-Of-Addressing. In IPv6 wireless network 406, wireless device 408 typically receives data packets addressed directly with its permanent IPv6 address. Router 426 (which facilitates communication between serving network 404 and IPv6 wireless network 406) performs conventional routing functions, and does not need to encapsulate data packets or operate in accordance with ISATAP.

As apparent, the "back end" of serving network 404 provides advantages as an IPv4-to-IPv6 transition mechanism. The inventive methodologies may be employed in connection with existing network components and methods. In the preferred implementation using Non-Broadcast Multiple Access (NBMA) techniques, the wireless link is not overburdened with overhead to accommodate for IPv4-to-IPv6 transition.

Finally, the front end (FIGS. 1-3) and the back end (FIGS. 4-8) of the serving network together provide a superior solution for IPv4-to-IPv6 address transitioning in systems that push information to wireless communication devices.

It is to be understood that the above is merely a description of preferred embodiments of the invention and that various changes, alterations, and variations may be made without departing from the true spirit and scope of the invention as set forth in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method in one of a plurality of tunnel servers of a serving network for facilitating a communication of user information between a host computer and at least one wireless communication device operative in a mobile communication network, where the serving network is not part of the mobile communication network and includes a network entry point device and a router between which the tunnel servers are connected, the router being operative to route communications between the tunnel servers and the mobile communication network, the method comprising the acts of;
   receiving, at the tunnel server, a tunnel request from the host computer through the network entry point device;
   establishing a tunnel connection having endpoints between the host computer and the tunnel server in response to the tunnel request;
   updating a local routing table to reflect the newly established tunnel connection;
   broadcasting, for receipt by at least one other tunnel server in the serving network, updated routing table information which reflects the newly established tunnel connection; and facilitating a communication of user information, through the tunnel server via the tunnel connection, and through the router, between the host computer and the wireless communication device operating in the mobile communication network.

2. The method of claim 1, wherein the tunnel server is coupled in an IPv6 communication network and communicates with the host computer which is coupled in an IPv4 communication network, and wherein the act of facilitating the communication of the user information via the tunnel connection comprises the further acts of:
   receiving, from the host computer, IPv4-addressed data packets having user information;
   decapsulating the IPv4-addressed data packets to reveal underlying IPv6-addressed data packets for communication to the wireless communication device;
   receiving, from the wireless communication device, IPv6-addressed data packets having user information; and
   encapsulating the IPv6-addressed data packets within IPv4-addressed data packets for communication to the host computer.

3. The method of claim 1, wherein the act of facilitating the communication of the user information via the tunnel connection comprises the further acts of:
   receiving, from the host computer, a first plurality of data packets having user information;
   decapsulating the first plurality of data packets to reveal decapsulated data packets for communication to the wireless communication device;
   receiving, from the wireless communication device, a second plurality of data packets having user information; and
   encapsulating the second plurality of data packets to produce encapsulated data packets for communication to the host computer.

4. The method of claim 1, wherein a dynamic routing protocol is used in performing the acts of updating the local routing table and broadcasting the updated routing table information.

5. The method of claim 1, further comprising the acts of:
   receiving, by the network entry point device, a new tunnel request from one of the host computers which has detected a communication failure with one of the tunnel servers;
   selecting and directing, by the network entry point device1 the new tunnel request to a new one of the tunnel servers;
   establishing, by the newly-selected tunnel server1 a new tunnel connection with the host computer; and
   updating the local routing table and broadcasting updated routing table information which reflects the new tunnel connection.

6. The method of claim 1, wherein the act of facilitating a communication of user information comprises facilitating synchronization of the user information, via the tunnel connection, between the host computer and the wireless communication device.

7. The method of claim 1, wherein the act of facilitating a communication of user information comprises providing for secure communications over the tunnel connection based on a Secure Shell (SSH) standard.

8. The method of claim 1, further comprising the acts of:
   receiving a new tunnel request from the host computer in response to a communication failure with the tunnel connection.

9. A method in a communication network for use in synchronizing user information between a plurality of host computers and a plurality of wireless communication devices operative in a mobile communication network which is outside of the communication network, the method comprising the acts of:
   providing the communication network with a front end subnetwork and a core network, the front end subnetwork including a network entry point device and a plurality of tunnel servers, the tunnel servers being connected between the network entry point device and a first router of the communication network, the first router adapted to route communications between the tunnel servers and the core network, the communication network further including a second router operative to route communications between the core network and the mobile communication network;
   receiving, at the network entry point device over a period of time, a plurality of tunnel requests from the host computers;
   distributively sending, by the network entry point device, the plurality of tunnel requests to the tunnel servers;
   establishing, by the tunnel servers, a plurality of tunnel connections between the host computers and the tunnel servers in response to the tunnel requests;
   performing, by each tunnel server and the router, a dynamic routing protocol (DRP);
   updating, by each tunnel server according to the DRP, a local routing table to reflect newly established tunnel connections;
   broadcasting, by each tunnel server according to the DRP, updated routing table information which reflects newly established tunnel connections to other tunnel servers and the router; and
   facilitating the synchronization of the user information between the host computers and the wireless communication devices operating in the mobile communication network through the tunnel server and the core network.

10. The method of claim 9, further comprising:
   receiving, by the network entry point device, a new tunnel request from one of the host computers which has detected a communication failure with one of the tunnel servers;
   selecting and directing, by the network entry point device, the new tunnel request to a new one of the tunnel servers;
   establishing, by the newly selected tunnel server, a new tunnel connection with the host computer; and
   performing, by the newly selected tunnel server, the DRP for updating the local routing table and for broadcasting updated routing table information.

11. A communication network for facilitating communications between a plurality of host computers and a plurality of wireless communication devices operative in a mobile communication network, the communication network comprising:
   a network entry point device;
   a plurality of tunnel servers;
   a core network;
   a first router;
   the tunnel servers being connected between the network entry point device and the first router;
   the first router being adapted to route communications between the tunnel servers and the core network;
   a second router;
   the second router being connected between the core network and the mobile communication network;
   the second router operative to route communications between the core network and the mobile communication network;

the network entry point device being operative to direct a plurality of tunnel requests, received from a plurality of host computers over a period of time, to the plurality of tunnel servers in a distributed manner;

each tunnel server being operative to establish and maintain a plurality of tunnel connections between host computers and the tunnel server in response to tunnel requests received therefrom;

each tunnel server being operative to facilitate a communication of user information, via a tunnel connection, between each host computer having the tunnel connection established with the tunnel server and at least one wireless communication device; and each tunnel server being operative to perform a dynamic routing protocol for updating a local routing table to reflect newly established tunnel connections and for broadcasting updated routing table information to the other tunnel servers.

12. The communication network of claim 11, wherein the communication network comprises an IPv6 communication network and at least one host computer communicates through an IPv4 communication network.

13. The communication network of claim 11, wherein each tunnel server is further operative to establish and maintain the plurality of tunnel connections which further comprise Transmission Control Protocol (TCP) connections.

14. The communication network of claim 11, wherein the network entry point device comprises a local director.

15. The communication network of claim 11, wherein the network entry point device comprises a round-robin domain name server (DNS).

16. The communication network of claim 11, wherein the communication network comprises an IPv6 communication network and the at least one host computer communicates through an IPv4 communication network, and wherein each tunnel server is further operative to facilitate the communication of the user information via the tunnel connection by:

receiving, from the host computer, IPv4-addressed data packets having user information;

decapsulating the IPv4-addressed data packets to reveal underlying IPv6-addressed data packets for communication to the wireless communication device;

receiving, from the wireless communication device, IPv6-addressed data packets having user information; and encapsulating the IPv6-addressed data packets within IPv4-addressed data packets for communication to the host computer.

17. The communication network of claim 11, wherein each tunnel server is further operative to facilitate the communication of the user information via the tunnel connection by:

receiving, from a host computer, a first plurality of data packets having user information;

decapsulating the first plurality of data packets to reveal decapsulated data packets for communication to the wireless communication device;

receiving, from the wireless communication device, a second plurality of data packets having user information; and encapsulating the second plurality of data packets to produce encapsulated data packets for communication to the host computer.

18. The communication network of claim 11, wherein each tunnel server is further operative to perform the dynamic routing protocol for broadcasting the updated routing table information to the other tunnel servers and the first router.

19. The communication network of claim 11, wherein each tunnel server is operative to facilitate the communication of user information by being operative to facilitate synchronization of the user information, via the tunnel connection, between each host computer and the at least one wireless communication device.

20. The communication network of claim 11, further comprising:

each host computer being operative to detect a communication failure with a tunnel server; and each host computer being operative to send a tunnel request for a new tunnel connection through the network entry point device in response to detecting the communication failure.

21. The communication network of claim 11, further comprising:

the first router being adapted to perform the dynamic routing protocol with the plurality of tunnel servers.

22. The communication network of claim 11, further comprising:

a front end subnetwork which includes the plurality of tunnel servers and the first router; and the first router being operative to perform the dynamic routing protocol with the plurality of tunnel servers.

* * * * *